H. P. SMITH.
Potato Digger.

No. 67,076.  Patented July 23, 1867.

Witnesses:

Inventor:

United States Patent Office.

HENRY P. SMITH, OF DENTON, MICHIGAN.

Letters Patent No. 67,076, dated July 23, 1867.

IMPROVEMENT IN POTATO-DIGGER.

*The Schedule referred to in these Letters Patent and making part of the same.*

TO ALL WHOM IT MAY CONCERN:

Be it known that I, HENRY P. SMITH, of Denton, in the county of Wayne, and State of Michigan, have invented a new and improved Potato-Digger; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved machine by means of which the potatoes may be easily and rapidly dug and separated from the dirt that may adhere to them; and it consists in the construction and arrangement of the forks and screens; in the combination of the cog-wheels, one of which is segmentally toothed with the axle and shaft of the machine for the purpose of communicating an intermitting action to said shafts; and in the combination of a cultivator or shovel-plough with the axle and tongue of the machine, the whole being constructed and arranged as hereinafter more fully described.

Figure 1:
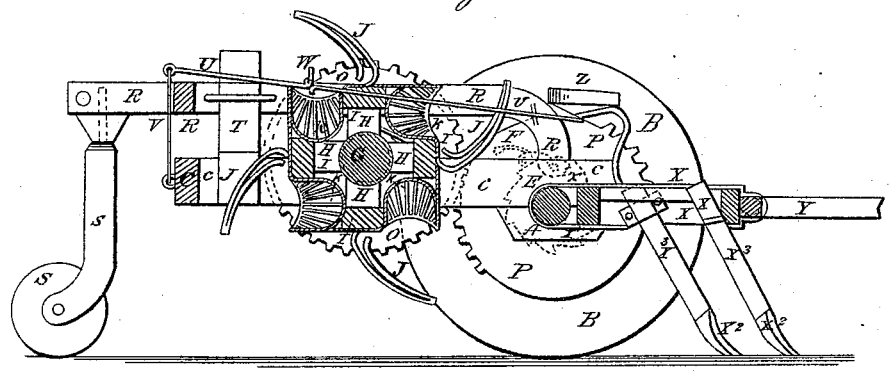
Figure 1 is a vertical detail sectional view of my improved machine, taken through the line $x\,x$, fig. 2.
Figure 2:
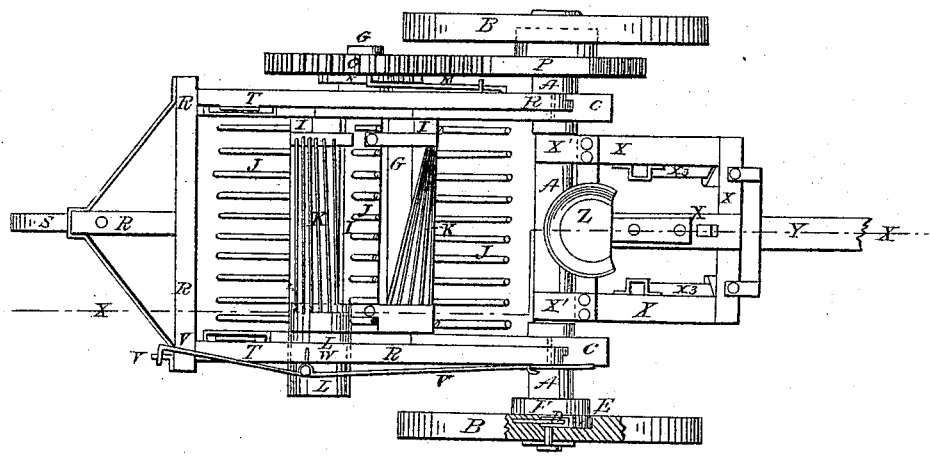
Figure 2 is a top or plan view of the same.

A is the axle upon which the wheels B revolve, and which revolves in bearings in the frame C. The wheels B, when they advance, are made to carry the axle A with them by the pawls D attached to said wheels, and which take hold of the ratchet-wheels E formed upon or attached to the axle A. The pawls D are held down to their work by the springs F, attached to the wheels B, and the free ends of which rest upon the pawls D, as shown in figs. 1 and 2. When moving backward the wheels B revolve freely upon the axle A. G is a shaft which revolves in bearings in the middle part of the frame C. Through the shaft G are passed radial arms H at right angles to each other, and the ends of each pair of which are connected by a horizontal bar, I, to which are attached the fork teeth J, the end ones of which are made larger and stronger than the others. The teeth J should be made of such a form that as the shaft G is revolved they will enter the ground a sufficient depth to pass under the potatoes and lift them and the dirt that may adhere to them out of the ground, carry them up, and deposit them in the screens K. The screens K are made semicircular in form, and slope gradually towards one side of the frame C, and the potatoes escape through the spout L and drop upon the ground at the side of the machine, the dirt falling through the bars of the said screens. The end bars of the screens K are made substantially in the shape shown in fig. 1, and their ends are attached to the adjacent cross-bars I. The shaft G is supported against the backward pressure while the forks are passing through the ground by the pawl M, which acts upon the teeth of the ratchet-wheel N formed upon or attached to the end of the shaft G. The teeth of the ratchet-wheel N are so arranged as to hold the shaft G stationary only while the forks are in position to act upon the ground. O is a toothed wheel securely attached to the end of the shaft G, and into the teeth of which mesh the teeth of the segmentally toothed wheel P, attached to the axle A, so as to impart an intermitting motion to the fork-shaft G, the teeth upon the wheel P being so arranged as to allow the shaft G to stand stationary for a short time while the fork is moving forward through the ground. R is a frame, the forward end of which is pivoted to the frame C directly above the axle A, and the rear end of which is supported upon a caster-wheel, S, as shown in fig. 1. The rear part of the frame C is connected to the frame R by the bars T, which are attached to the frame C, and pass up through keepers attached to the frame R. The bars T should have a number of holes formed through them, so that by the insertion of pins the frame C, and consequently the forks J, may be supported in such a position that the said forks may run at any desired depth in the ground. U is a lever, the rear end of which is connected to the rear part of the frame C by the connecting-rod V, the middle part of which is pivoted to a suitable support, W, attached to the frame R, and the forward end of which extends forward into such a position that it can be reached and operated by the driver from his seat for the purpose of raising the fork-teeth away from the ground to pass over obstructions, or for convenience in moving the machine from place to place. X is the cultivator frame, the rear end of which rests against the axle A, to which it is secured by the straps $x^1$ which pass around the said axle, as shown in figs. 1 and 2. $x^2$ are the shovels, the standards $x^3$ of which are adjustably secured to the frame X so that they may be adjusted to run at any desired depth in the ground to loosen it and raise the potatoes so that they may be more easily taken up by the forks. Y is the tongue which is hinged or pivoted to the forward end of the cultivator frame X, so that should the ploughs strike an obstruction the frame A may give or fly up to prevent the machine from being broken. Z is the driver's seat, the standard of which is attached to the central beam of the cultivator frame.

I claim as new, and desire to secure by Letters Patent—

1. The forks J and screens K, constructed and arranged as herein described, in combination with the shaft G, as and for the purpose set forth.

2. The combination of the cog-wheel O and segmentally toothed cog-wheel P with each other and with the shaft G and axle A, substantially as herein shown and described, for the purpose of communicating an intermitting motion to the fork-shaft G, as set forth.

3. The combination of a cultivator or shovel-plough, X, with the axle A and tongue Y, substantially as herein shown and described and for the purpose set forth.

The above specification of my invention signed by me this 29th day of April, 1867.

HENRY P. SMITH.

Witnesses:
    H. T. EBERLE,
    AMBROSE S. MALLERY.